(12) United States Patent
Ben-Bassat

(10) Patent No.: US 8,583,065 B2
(45) Date of Patent: Nov. 12, 2013

(54) DIGITALLY CONTROLLED ANTENNA TUNING CIRCUIT FOR RADIO FREQUENCY RECEIVERS

(75) Inventor: David Ben-Bassat, Yehud (IL)

(73) Assignee: Vishay Intertechnology, Inc., Malvern, PA (US)

( * ) Notice: Subject to any disclaimer, the term of this patent is extended or adjusted under 35 U.S.C. 154(b) by 531 days.

(21) Appl. No.: 11/759,594

(22) Filed: Jun. 7, 2007

(65) Prior Publication Data
US 2008/0305749 A1 Dec. 11, 2008

(51) Int. Cl.
*H04B 1/26* (2006.01)

(52) U.S. Cl.
USPC ............... 455/197.3; 455/193.2; 455/193.1; 455/77; 455/120

(58) Field of Classification Search
USPC ........ 455/424, 425, 456.5, 456.6, 561, 550.1, 455/575.1, 575.7, 193.1, 191.1, 290, 281; 343/702, 714, 722, 833, 823, 868, 750; 334/78, 71
See application file for complete search history.

(56) References Cited

U.S. PATENT DOCUMENTS

| | | | |
|---|---|---|---|
| 3,414,833 A | 12/1968 | Tolliver | 330/53 |
| 3,611,154 A | 10/1971 | Kupfer | 325/459 |
| 4,442,438 A * | 4/1984 | Siwiak et al. | 343/792 |
| 4,486,722 A | 12/1984 | Landt | 333/17 |
| 4,494,122 A * | 1/1985 | Garay et al. | 343/722 |
| 4,502,025 A * | 2/1985 | Carl et al. | 333/24 R |
| 4,564,843 A | 1/1986 | Cooper | 343/745 |
| 4,631,546 A * | 12/1986 | Dumas et al. | 343/833 |
| 4,701,732 A * | 10/1987 | Nestlerode | 334/56 |
| 4,800,395 A * | 1/1989 | Balzano et al. | 343/895 |
| 4,806,944 A | 2/1989 | Jacomb-Hood | 343/745 |
| 4,939,525 A * | 7/1990 | Brunner | 343/745 |
| 5,001,355 A * | 3/1991 | Rosen et al. | 250/551 |
| 5,065,121 A | 11/1991 | Ghadaksaz | 333/235 |
| 5,594,394 A * | 1/1997 | Sasaki et al. | 333/103 |
| 5,767,807 A * | 6/1998 | Pritchett | 342/374 |
| 5,872,489 A * | 2/1999 | Chang et al. | 331/179 |
| 5,914,544 A * | 6/1999 | Tanaka et al. | 307/130 |
| 5,943,016 A | 8/1999 | Snyder, Jr. et al. | |
| 5,969,673 A | 10/1999 | Bickley et al. | |
| 6,061,025 A * | 5/2000 | Jackson et al. | 343/700 MS |

(Continued)

FOREIGN PATENT DOCUMENTS

| | | |
|---|---|---|
| JP | 09-035942 | 2/1997 |
| JP | 10-163916 * | 6/1998 |

(Continued)

*Primary Examiner* — Temesgh Ghebretinsae
*Assistant Examiner* — Richard Chan
(74) *Attorney, Agent, or Firm* — Howard Zaretsky, Esq.; Woods Oviatt Gilman LLP

(57) ABSTRACT

A novel digitally controlled antenna tuning circuit that enables the implementation of low cost, wideband tuning circuits for antennas in receive applications. The invention is operative to switch a plurality of tuning elements into and out of a main receive signal path. Each individual tuning element is switched into or out of the receive signal path using a single PIN diode. For series connected tuning elements, the diode is connected in parallel to the tuning element. For tuning elements connected in parallel, the diode is connected in series with the tuning element. The diodes are switched in accordance with control voltages which forward bias the diodes to effectively create a low resistance path thus either inserting or removing a tuning element from the receive signal path depending on its configuration in the circuit.

27 Claims, 8 Drawing Sheets

(56) References Cited

U.S. PATENT DOCUMENTS

| | | | |
|---|---|---|---|
| 6,169,523 B1 | 1/2001 | Ploussios | |
| 6,252,733 B1 * | 6/2001 | Staszewski | 360/51 |
| 6,336,036 B1 * | 1/2002 | Hayes | 455/550.1 |
| 6,501,427 B1 | 12/2002 | Lilly et al. | |
| 6,608,598 B2 * | 8/2003 | Gee et al. | 343/749 |
| 6,765,536 B2 * | 7/2004 | Phillips et al. | 343/702 |
| 6,795,128 B2 * | 9/2004 | Yamamoto | 348/729 |
| 7,034,760 B2 | 4/2006 | Nakamura | 343/745 |
| 7,136,021 B2 | 11/2006 | Huang et al. | |
| 7,180,452 B2 | 2/2007 | Saito | |
| 7,869,764 B2 * | 1/2011 | Wennrich | 455/41.2 |
| 8,179,263 B2 * | 5/2012 | Kitayoshi et al. | 340/572.7 |
| 8,350,970 B2 * | 1/2013 | Birkett et al. | 348/731 |
| 2002/0044092 A1 * | 4/2002 | Kushihi | 343/702 |
| 2003/0096583 A1 | 5/2003 | Watanabe | |
| 2004/0125027 A1 * | 7/2004 | Rubinshteyn et al. | 343/702 |
| 2004/0233109 A1 * | 11/2004 | Ying et al. | 343/700 MS |
| 2006/0063499 A1 | 3/2006 | Miyagi | |
| 2008/0088415 A1 * | 4/2008 | Quan | 340/10.3 |
| 2008/0194219 A1 * | 8/2008 | Castaneda et al. | 455/193.1 |
| 2009/0305738 A1 * | 12/2009 | Boyle | 455/556.1 |

FOREIGN PATENT DOCUMENTS

| | | | |
|---|---|---|---|
| JP | 2004-343337 | * | 2/2004 |
| JP | 2006-191270 | | 7/2006 |
| JP | 2008-113233 | | 5/2008 |
| KR | 10-2003-0057848 | | 7/2003 |
| KR | 10-2006-0010634 | | 2/2006 |

* cited by examiner

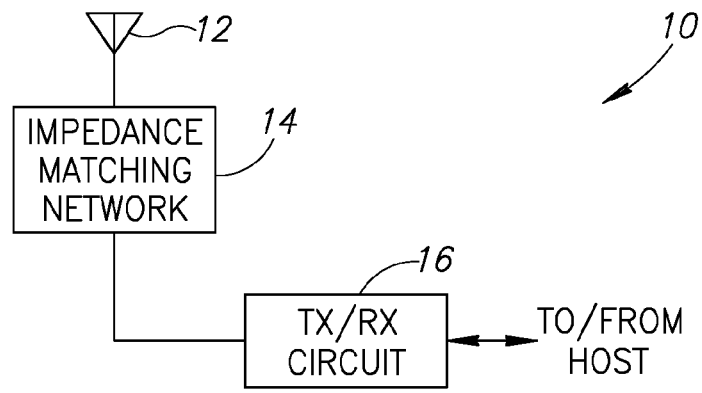
FIG.1
PRIOR ART
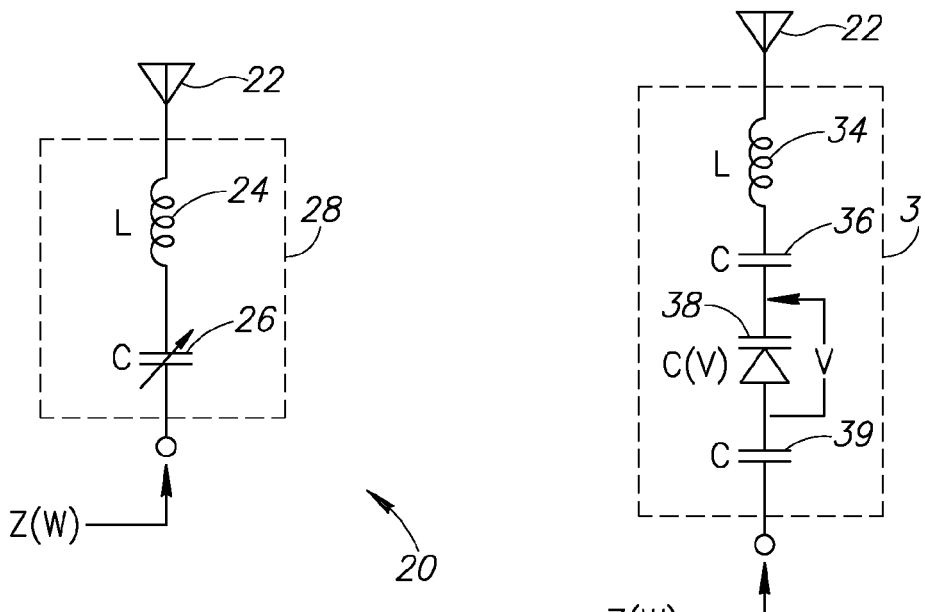
FIG.2
PRIOR ART
FIG.3
PRIOR ART

DIGITALLY CONTROLLED ANTENNA TUNING CIRCUIT FOR RADIO FREQUENCY RECEIVERS

FIELD OF THE INVENTION

The present invention relates generally to antenna tuning circuits and more particularly to digitally controlled antenna tuning circuits for use with radio frequency (RF) receivers.

BACKGROUND OF THE INVENTION

As the use of computers and especially handheld or mobile electronic devices continues to increase at a rapid rate, the demand for peripherals and systems connected via wireless connections continues to increase. The number of wireless applications is currently increasing at a very high rate in areas such as security alarms, networking, personal computing, data communications, telephony and computer security.

Wireless communications currently may take many forms such as ultrasonic, IR and RF. In the case of RF communications, wireless transmitters, receivers and transceivers use one or more antenna elements to convert an electrical RF signal to and from an electromagnetic wave. During transmission, the antenna serves as a radiator, generating the electromagnetic wave. During reception, the antenna serves as an absorber, receiving the electromagnetic wave.

An antenna is a transducer designed to transmit and/or receive radio waves which are a class of electromagnetic waves. Antennas function to convert RF electrical currents into electromagnetic waves and to convert electromagnetic waves into RF currents. Antennas are used in systems such as radio and television broadcasting, point-to-point radio communication, Wireless Local Area Network (WLAN), Broadband Wireless Access (BWA), radar, and space exploration.

An antenna typically comprises an arrangement of electrical conductors that generate a radiating electromagnetic field in response to an applied alternating voltage and the associated alternating electric current. When placed in an electromagnetic field, the field induces an alternating current in the antenna and a voltage is generated between its terminals.

An antenna is an electrical element having defined resonance frequencies and bandwidth. The resonant frequency of an antenna is related to the electrical length of the antenna (i.e. the physical length of the wire divided by its velocity factor). Typically, an antenna is tuned for a specific frequency and is effective for a range of frequencies usually centered around the resonant frequency. Other properties of the antenna (especially radiation pattern and impedance), however, change with frequency.

Often times, however, the natural operating frequency band of the antenna is either (1) not sufficiently wide enough to cover the needs of the wireless system or (2) is not in the proper spectrum location where the antenna is required to function. In such cases, a tuning circuit is added to the antenna which allows it to operate over a wide range of frequencies.

As an electromagnetic wave travels through the different parts of the antenna system (e.g., radio, feed line, antenna, free space) it encounters differences in impedance. At each interface, depending on the impedance mismatch, some fraction of the energy of the wave reflects back to the source forming a standing wave in the feed line. The ratio of maximum power to minimum power in the wave is called the standing wave ratio (SWR). Minimizing impedance differences at each interface via impedance matching minimizes the SWR and maximizes power transfer through the antenna system.

As with the resonant frequency, the complex impedance of an antenna is also related to the electrical length of the antenna at the wavelength in use. The impedance of an antenna can be matched to the feed line and radio by adjusting the impedance of the feed line, using the feed line as an impedance transformer. More commonly, however, the impedance is adjusted at the load using an antenna tuning circuit, balun, matching transformer or impedance matching networks composed of inductors and capacitors.

Currently, two types of antenna tuning circuits are in widespread use today. One is varactor based tuning circuits and the second is PIN diode tuning circuits. Note that in some cases, the two circuit types can be combined into a single hybrid tuning circuit.

Varactor Based Tuning Circuits

A tuning circuit for an antenna is basically a reactive network (ideally lossless), based on reactive inductors, capacitors and variable capacitors (i.e. varicaps). The tuning circuit functions as an impedance matching network that matches the antenna's impedance for maximum power transfer to and from the source. By definition, however, the impedance matching network has a limited defined bandwidth. Therefore, the antenna impedance is matched only with this limited defined bandwidth.

In order to actively cover a wider bandwidth using an impedance matching network, variable capacitors are used. A variable capacitor is a capacitor whose capacitance may be changed mechanically or electrically (i.e. a varactor). Variable capacitors are typically used to set the resonance frequency in LC circuits or as a variable reactance used for impedance matching in antenna tuners.

A block diagram illustrating a prior art example of an impedance matching network coupled to a TX/RX circuit is shown in FIG. 1. The circuit, generally referenced 10, comprises an impedance matching network 14 adapted to match the impedance of the antenna 12 to that of the TX/RX circuit 16.

A schematic diagram illustrating a prior art example of an impedance matching network based on a mechanically variable capacitor is shown in FIG. 2. The circuit, generally referenced 20, comprises an impedance matching network 28 adapted to match the impedance of the antenna 22 to the output impedance of the signal source. The impedance matching network 28 is based on inductance L 24 and variable capacitor C 26. Note that the capacitor 26 comprises a mechanically variable capacitor.

A schematic diagram illustrating a prior art example of an impedance matching network based on an electrically variable capacitor is shown in FIG. 3. The circuit, generally referenced 30, comprises an impedance matching network 31 adapted to match the impedance of the antenna 32 to the output impedance of the signal source. The impedance matching network 31 comprises inductance L 34, variable capacitor C(V) 38 and DC blocking capacitors C 36, 39. Note that the capacitor C(V) comprises an electrically variable capacitor (i.e. varactor).

In both FIGS. 2 and 3, the antenna impedance matching network is a series LC network. This network functions as a first order band pass filter. The impedance generated at the port is expressed mathematically below in Equation 1:

$$Z(\omega) = Z_{ant} + Z_L + Z_C \qquad (1)$$

$$= Z_{ant} + j\omega L + \frac{1}{j\omega C}$$

$$= Z_{ant} + j\left(\omega L - \frac{1}{\omega C}\right)$$

where

Z(ω) is the impedance as seen looking into the matching network;

$Z_{ant}$ is the impedance of the antenna;

$Z_L$ is the impedance of the inductor L;

$Z_C$ is the impedance of the capacitor C;

ω is the frequency in radians;

L is the value of the inductor;

C is the value of the capacitor;

Equation 1 above demonstrates the relation between the impedance and the capacitor value C. In the electrically tunable circuit shown in FIG. 3, a varactor element 38 is used to implement the variable capacitance. A varactor or tuning diode is a type of diode having a variable capacitance that is a function of the voltage applied to its terminals. The diode presents an AC capacitance when a reverse biased voltage V is applied across its terminals. The capacitance is a function of the reverse DC voltage V imposed on the diode. This is presented in the drawing as C(V). Generally, the width of the depletion region across the PN junction of the varactor is proportional to the square root of the applied voltage and capacitance is inversely proportional to the depletion region width. Therefore, capacitance is inversely proportional to the square root of the applied voltage.

To avoid any DC coupling, the varactor diode is AC coupled using capacitors C 36, 39 on its two terminal ends. The coupling capacitors C are of much greater value than the AC capacitance presented by the varactor, therefore they do not play a major role in establishing the impedance matching characteristics of the tuning circuit.

PIN Diode Based Tuning Circuits

A schematic diagram illustrating an example prior art PIN diode digital tuning circuit is shown in FIG. 4. The circuit, generally referenced 40, comprises an impedance matching circuit 41 coupled to an antenna 42. The impedance matching circuit 41 comprises inductors L1, L2, L3, L4 referenced 74, 72, 70, 68, respectively, PIN diodes 44, 46, 48, 50, 52, 54, 60, 62, 64, 66, capacitor C 76 and resistor R 78.

A PIN diode is a diode with a wide, undoped intrinsic semiconductor region between p-type semiconductor and n-type semiconductor regions. PIN diodes act as near perfect resistors at RF and microwave frequencies. The resistance is dependent on the DC current applied to the diode. The benefit of a PIN diode is that the depletion region exists almost completely within the intrinsic region, which is almost a constant width regardless of the reverse bias applied to the diode. This intrinsic region can be made large, increasing the area where electron-hole pairs can be generated.

In operation, a PIN diode is an RF element that can be in one of two operating modes. The first mode of operation is when the diode is not DC biased forward where it presents very low capacitive AC impedance. In the second mode of operation the diode is DC biased forward where it presents very low resistive AC impedance.

In the circuit of FIG. 4, which is used for both transmit and receive operations, the PIN diodes are DC switched on (i.e. forward biased) and off (i.e. not forward biased) so as to function as RF switches that can be opened and closed. A DC bias voltage 88 is applied to the series inductors. This bias voltage is prevented from leaking back to the RF signal source 89 via blocking capacitor C 76.

The circuit 41 utilizes switched PIN diodes to realize a tuning circuit comprising a set of inductors connected in series. The inductors, marked L1-L4 present a total inductance of $$L = L1 + L2 + L3 + L4 \quad (2)$$

The array of PIN diodes arranged in parallel to this set of inductors enables short circuiting each inductor individually via control signals CONTROL 1 (80), CONTROL 2 (82), CONTROL 3 (84), CONTROL 4 (86). By short circuiting each inductor, a lower total inductance can effectively be generated. For example, if inductors L1 and L4 are short circuited via control signals CONTROL 1 and CONTROL 4, respectively, than the total inductance along the signal path becomes $$L = L2 + L3 \quad (3)$$

The tuning circuits presented above, and other tuning circuits derived from the same family of topologies, however, suffer from the following disadvantages. Regarding the varactor based tuning circuits described above, the use of varactors limits the dynamic range of the circuit. Most varactors typically have a relatively low variance range of capacitive values. A typical varactor provides for a factor of two between its lowest and highest values.

Regarding the PIN diode based tuning circuit described above, tuning topologies based on the use of PIN diodes requires at least two PIN diodes for each stage with some stages requiring four PIN diodes. This is necessary where relatively high levels of power are present during transmit operation. Commonly used PIN diodes are relatively expensive components. Thus, a disadvantage of this topology is the large number of PIN diodes required to realize the circuit. At least two PIN diodes are required for each stage in the tuning circuit to handle relatively high power RF signals. Depending on the application, when in transmit mode, the path to the antenna may be required to handle high power RF signals. Such high powered signals are likely to affect the DC bias point of the PIN diodes. Thus, the two or four PIN diodes in the circuit 41 (FIG. 4) is required to enable the tuning circuit to maintain the DC bias point of the PIN diodes.

It would therefore be desirable to have an antenna tuning circuit that is capable of selectively switching tuning elements in and out of the antenna signal path in accordance with applied control signals. The antenna tuning circuit should be able to selectively switch tuning elements utilizing a single PIN diode per element thus significantly reducing the cost of the tuning circuit.

SUMMARY OF THE INVENTION

The present invention is a novel digitally controlled antenna tuning circuit that overcomes the disadvantages and drawbacks of prior art tuning circuits. The antenna tuning circuit of the present invention enables the implementation of low cost, wideband tuning circuits for antennas in receive applications.

The invention is operative to provide for the switching of a plurality of tuning elements into and out of a main receive signal path. Each individual tuning element is switched into or out of the receive signal path using a single PIN diode. For series connected tuning elements, the diode is connected in parallel to the tuning element. For tuning elements connected in parallel, the diode is connected in series with the tuning element. Applying a control voltage across the diode forward biases it and it can be considered effectively a low resistance. Thus, for diodes connected in parallel to the tuning element, a high control voltage across the diode creates an electrical short circuit thus taking the tuning element out of the main receive signal path. For diodes connected in series with the tuning element, a high control voltage across the diode creates an electrical short circuit thus inserting the tuning element into the main receive signal path.

Since the circuits of the present invention assume small signal receive power levels, they are not applicable to transmitter applications which typically feed high powered signals to the antenna. The tuning circuits of the invention are applicable to receive mode operation of transceivers or to receivers constructed only to receive an RF signal and not transmit.

One application of the tuning circuits of the invention is in mobile and handheld devices such as PDAs, cell phones, etc. Although not suitable for transmission of the cellular signal, the tuning circuits of the present invention can be used in FM receiver circuits, television signal receiver circuits, GPS receiver circuits or any other receive mode application (i.e. transceiver or receive only) where the power generated on the antenna and passing through the receive signal path can be considered 'small signal.'

The use of the antenna tuning circuits of the present invention provides numerous advantages, including the following: (1) the ability to reduce the number of PIN diodes required per tuning element from two or four in prior art circuits to one, thus significantly reducing the cost of the resulting circuit; (2) the ability to configure tuning elements in the antenna tuning circuit in either a parallel or series configuration; and (3) the ability to use any combination and number of capacitors and inductors in the antenna tuning circuit in any desired parallel or series configuration.

Note that some aspects of the invention described herein may be constructed as soft core realized HDL circuits embodied in an Application Specific Integrated Circuit (ASIC), Field Programmable Gate Array (FPGA) or other integrated circuit (IC), or as functionally equivalent discrete hardware components.

There is thus provided in accordance with the present invention, an antenna tuning circuit comprising one or more tuning stages coupled to an antenna for receiving a radio frequency (RF) signal, the one or more tuning stages operative to form a main signal path from the antenna to an output and one or more PIN diodes, each PIN diode coupled to one of the tuning stages and operative to electrically insert and remove its corresponding tuning stage from the main signal path in accordance with a control signal.

There is also provided in accordance with the present invention, a antenna tuning circuit comprising a plurality of tuning stages coupled in a series configuration, one end of the series combination coupled to an antenna adapted to receive a radio frequency (RF) signal, the series combination operative to form a main signal path from the antenna to an output and a plurality of PIN diodes, each PIN diode coupled in parallel across one of the tuning stages and operative to electrically insert and remove a corresponding tuning stage from the main signal path in accordance with a control signal.

There is further provided in accordance with the present invention, a antenna tuning circuit comprising a plurality of tuning stages coupled in a parallel configuration, one end of the parallel combination coupled to an antenna adapted to receive a radio frequency (RF) signal, the parallel combination operative to form a main signal path from the antenna to an output and a plurality of PIN diodes, each PIN diode coupled in series with one of the tuning stages and operative to electrically insert and remove a corresponding tuning stage from the main signal path in accordance with a control signal.

There is also provided in accordance with the present invention, a antenna tuning circuit comprising a plurality of tuning elements arranged in one or more series and parallel combinations, switching means coupled to the plurality of tuning elements and operative to connect one or more of the tuning elements to a main signal path thus creating an impedance network for an antenna coupled thereto and the switching means comprising a plurality of PIN diodes, each individual PIN diode operative to eclectically switch one of the tuning elements into or out of the main signal path in accordance with a respective control signal.

There is further provided in accordance with the present invention, a mobile communications device comprising a cellular transceiver operative to receive and transmit cellular transmissions to and from a base station, a second radio operative to only receive a signal from an antenna coupled thereto, an antenna tuning circuit coupled to the antenna and the second radio, the antenna tuning circuit comprising a plurality of tuning elements arranged in one or more series and parallel combinations, switching means coupled to the plurality of tuning elements and operative to connect one or more of the tuning elements to a main signal path thus creating an impedance network for an antenna coupled thereto, the switching means comprising a plurality of PIN diodes, each individual PIN diode operative to eclectically switch one of the tuning elements into or out of the main signal path in accordance with a respective control signal and a processor operative to receive data from the second radio and to send and receive data to and from the cellular transceiver.

BRIEF DESCRIPTION OF THE DRAWINGS

The invention is herein described, by way of example only, with reference to the accompanying drawings, wherein:

FIG. 1 is a block diagram illustrating a prior art example of an impedance matching network coupled to a TX/RX circuit;

FIG. 2 is a schematic diagram illustrating a prior art example of an impedance matching network based on a mechanically variable capacitor;

FIG. 3 is a schematic diagram illustrating a prior art example of an impedance matching network based on an electrically variable capacitor;

DETAILED DESCRIPTION OF THE INVENTION

Notation Used Throughout

Figure 4:
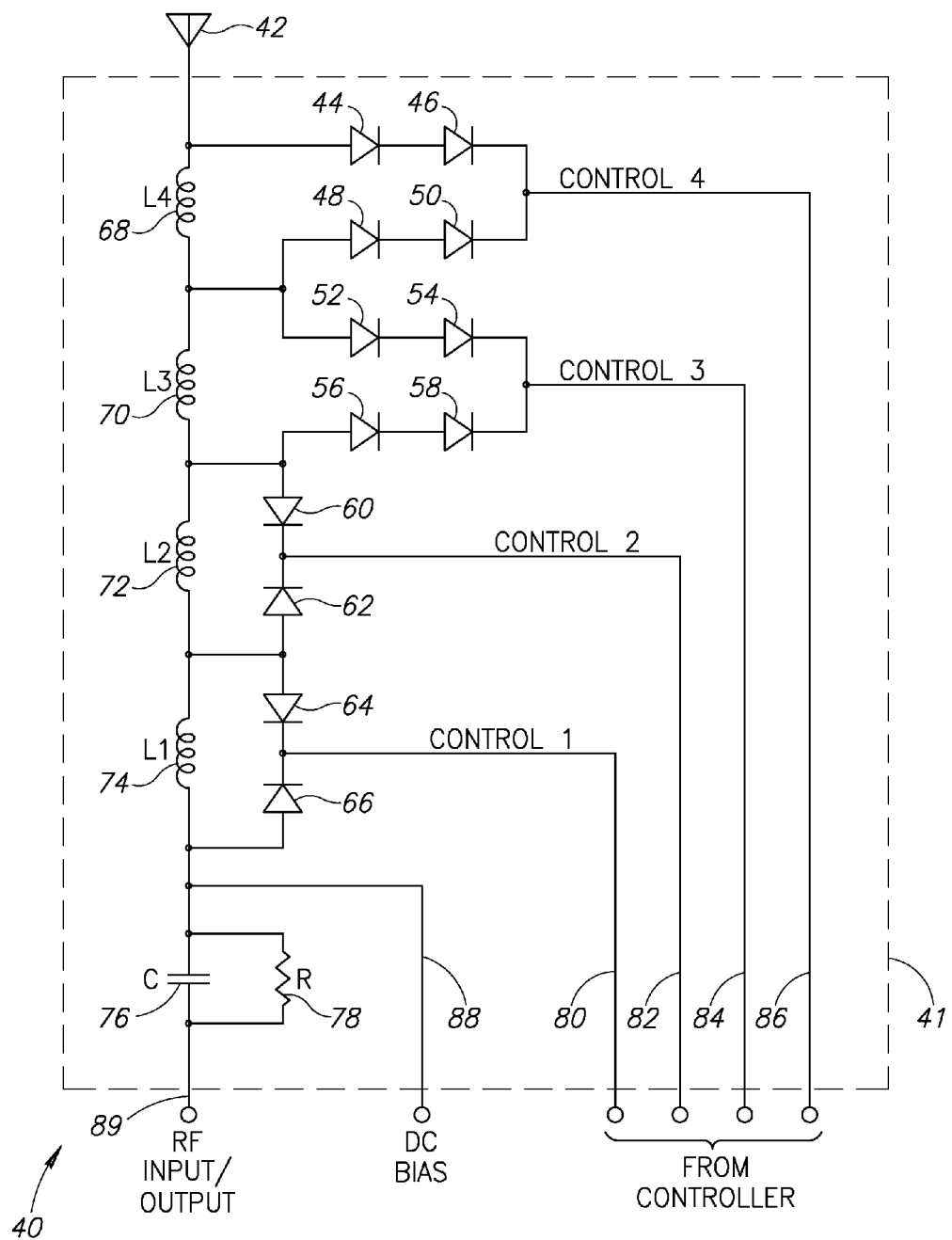
FIG. 4 is a schematic diagram illustrating an example prior art PIN diode digital tuning circuit.

The following notation is used throughout this document.

| Term | Definition |
| --- | --- |
| AC | Alternating Current |
| ASIC | Application Specific Integrated Circuit |
| AVI | Audio Video Interleave |
| BMP | Windows Bitmap |
| BWA | Broadband Wireless Access |
| CPU | Central Processing Unit |
| DC | Direct Current |
| DSL | Digital Subscriber Line |
| FM | Frequency Modulation |
| FPGA | Field Programmable Gate Array |
| GPS | Global Positioning System |
| IC | Integrated Circuit |
| IEEE | Institute of Electrical and Electronics Engineers |
| IR | Infrared |
| JPG | Joint Photographic Experts Group |
| LAN | Local Area Network |
| MBOA | Multiband OFDM Alliance |
| MP3 | MPEG-1 Audio Layer 3 |
| MPG | Moving Picture Experts Group |
| OFDM | Orthogonal Frequency Division Multiplexing |
| PC | Personal Computer |
| PDA | Portable Digital Assistant |
| RAM | Random Access Memory |
| RF | Radio Frequency |
| ROM | Read Only Memory |
| SIM | Subscriber Identity Module |
| SWR | Standing Wave Ratio |
| TV | Television |
| USB | Universal Serial Bus |
| UWB | Ultra Wideband |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |

Detailed Description of the Invention

The present invention is a novel digitally controlled antenna tuning circuit that overcomes the disadvantages and drawbacks of prior art tuning circuits. The antenna tuning circuit of the present invention enables the implementation of low cost, wideband tuning circuits for antennas in receive applications.

Since the circuits of the present invention assume small signal receive power levels, they are not applicable to transmitter applications which typically feed high powered signals to the antenna. The tuning circuits of the invention are applicable to receive mode operation of transceivers or to receivers constructed only to receive an RF signal and not transmit.

One application of the tuning circuits of the invention is in mobile and handheld devices such as PDAs, cell phones, etc. Although not suitable for transmission of the cellular signal, the tuning circuits of the present invention can be used in FM receiver circuits, television signal receiver circuits, GPS receiver circuits or any other receive mode application (i.e. transceiver or receive only) where the power generated on the antenna and passing through the receive signal path can be considered 'small signal.'

Although the packet detection mechanism of the present invention can be incorporated in numerous types of wireless or wired communication devices such a multimedia player, cellular phone, PDA, DSL modem, WPAN device, etc., it is described in the context of a cellular phone or mobile communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to provide impedance matching between an antenna and receiver circuit.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Antenna Tuning Circuit

An assumption of the invention is that the RF circuit to which the antenna tuning circuit of the invention is connected to, is used in receive mode only. Considering a receive mode only operation, it can be assumed that relatively low RF power is generated on the antenna due to the properties of RF wave propagation decay.

Thus, based on this assumption, when in receive mode, the power generated at the antenna and passing through the receive circuit path can be considered 'small signal.' By small signal, it is meant that the receive signal does not significantly influence the DC bias point set on the receive signal path.

As an example, assume the power received at the antenna is −30 dBm=0.001 mW=1 μW. Assuming the typical impedance along the receive signal path is 50 Ohm, a 1 μW receive signal generates a voltage swing of approximately 20 $mV_{PTP}$ (7 $mV_{RMS}$). If the DC voltage across a diode in the circuit is approximately 1 V, a 20 mV signal would not significantly change the bias set point of the diode.

Thus, based on this assumption and in accordance with the present invention, there is provided an antenna tuning circuit for receive only antennas. A key feature of the antenna tuning circuit is that it utilizes a single PIN diode to switch a tuning element into and out of the receive signal path. Several example antenna tuning circuits are presented infra with each utilizing this topology.

First Embodiment Antenna Tuning Circuit

Figure 5:
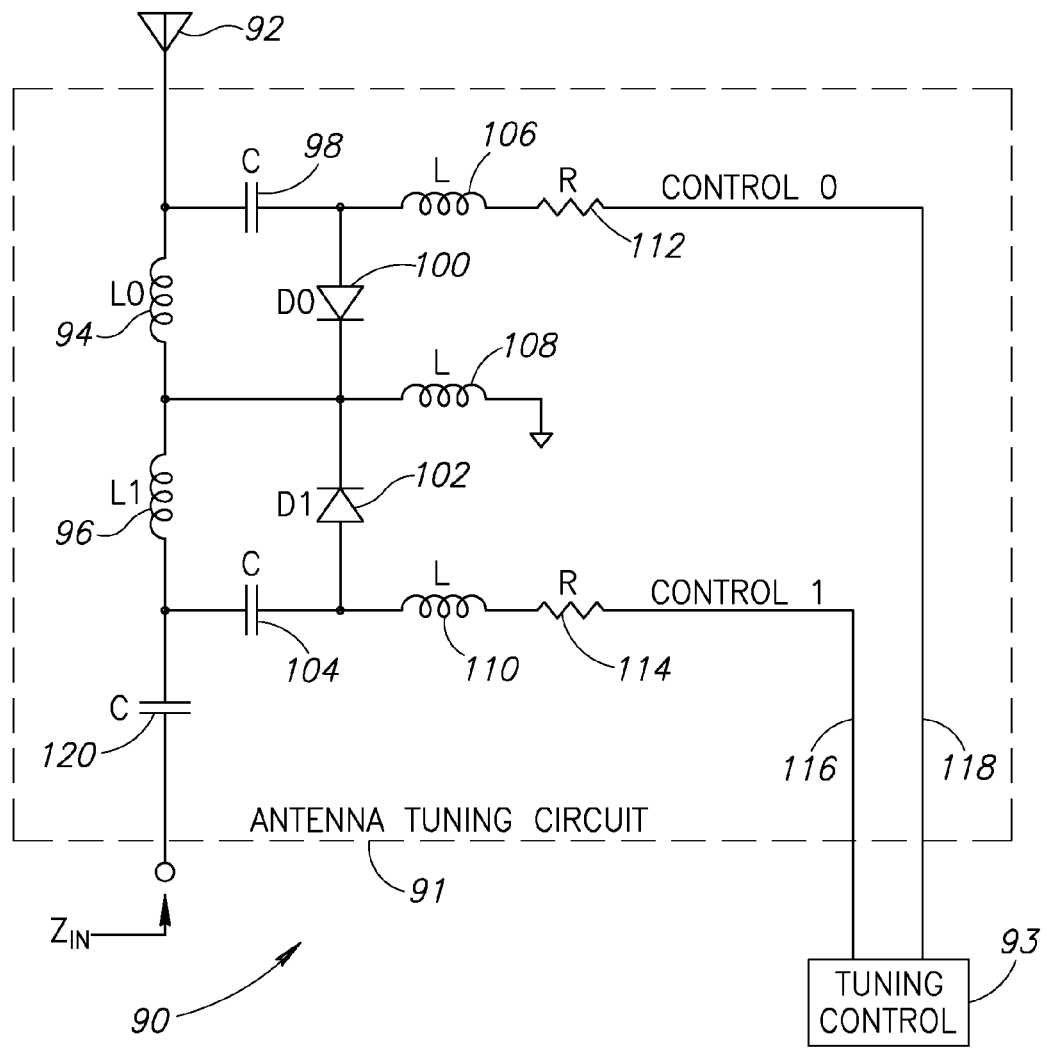
FIG. 5 is a schematic diagram illustrating a first example embodiment of the antenna tuning circuit of the present invention having series connected tuning elements.

A schematic diagram illustrating a first example embodiment of the antenna tuning circuit of the present invention having series connected tuning elements is shown in FIG. 5. The circuit, generally referenced 90, comprises a tuning circuit 91 coupled to antenna 92 and a tuning control circuit 93. The tuning circuit comprises two series connected tuning stages comprising tuning elements made up of inductors L0 (94), L1 (96), DC blocking capacitors C 98, 104, 120, RF chokes L 106, 108, 110, resistors R 112, 114 and switching devices comprising PIN diodes D0 (100), D1 (102).

In accordance with the invention, it is assumed that the signals flowing through the main receive signal path are sufficiently weak enough to allow the use of a single PIN diode to short circuit a single tuning stage. In the example circuit 90, the main receive signal path comprises two tuning elements connected in series (L0 and L1).

Two switching elements comprising PIN diodes D0 and D1 are connected in parallel to inductors L0 and L1, respectively. Each of the PIN diodes has two switching states (i.e. operating modes), namely either forward biased or not forward biased. By switching the diodes between their two operating modes, inductors L0 and L1 are individually short circuited. The digital control lines Control0 118 and Control1 116 provide four possible combinations of tuning circuits.

For example, when the digital control signal Control0 is high, the diode D0 is in forward bias. A PIN diode in forward bias can be considered a resistor with very low resistance value for RF signals. Given this diode is parallel to the inductor L0, L0 can be effectively replaced by a short circuit. Therefore, when the Control0 signal voltage applied to diode D0 is high, L0 is electrically short circuited. Note that the impedance of the DC blocking capacitor C 98, 104 is negligible at the operating RF frequencies of the circuit. The tuning control circuit 93 provides the appropriate DC bias voltages on the control signals Control0 and Control1 to yield the desired impedance $Z_{IN}$ of the antenna tuning circuit 91.

It is important to note that the capacitors labeled 'C' (98, 104) are used as AC coupling devices to avoid connecting the PIN diode directly parallel to the inductor. Typical values of capacitance C should be chosen high enough such that the capacitors can be considered very low impedances at the operating radio frequency of the system.

Similarly, the inductors labeled 'L' are used as DC couplings (AC blocking) to prevent RF leakage from the main receive signal path to the digital control signals. Typical values of inductance L should be chosen high enough such that the inductors can be considered very high impedances at the operating radio frequency of the system.

Further, the resistors labeled 'R' are used as current limiters to set the DC bias voltage of the PIN diodes at a suitable value. The value of resistance R should be selected in accordance with (1) the desired operating point and (2) the voltage provided by the digital control signal.

An illustrative example provided as a guideline in selecting the values of the AC coupling capacitors C, AC blocking inductors L and current limiting resistors R is provided infra.

Second Embodiment Antenna Tuning Circuit

Figure 6:
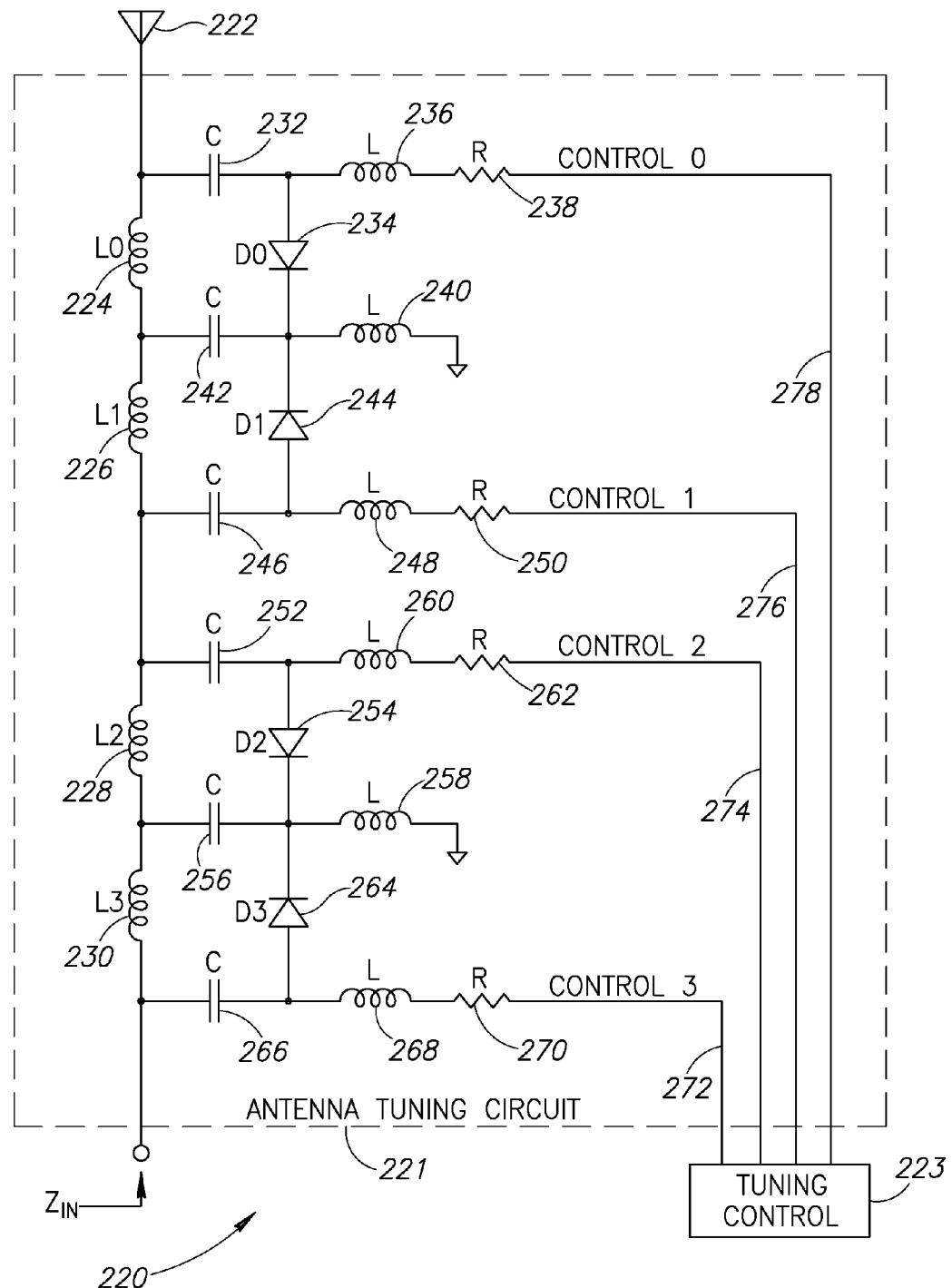
FIG. 6 is a schematic diagram illustrating a second example embodiment of the antenna tuning circuit of the present invention having series connected tuning elements.

A schematic diagram illustrating a second example embodiment of the antenna tuning circuit of the present invention having series connected tuning elements is shown in FIG. 6. The circuit, generally referenced 220, comprises a tuning circuit 221 coupled to antenna 222 and a tuning control circuit 223. The tuning circuit comprises four series connected tuning stages comprising tuning elements made up of inductors L0 (224), L1 (226), L2 (228), L3 (230), DC blocking capacitors C 232, 242, 246, 252, 256, 266, RF chokes L 236, 240, 260, 258, 268, resistors R 238, 250, 262, 270 and switching devices comprising PIN diodes D0 (234), D1 (244), D2 (254), D3 (264).

In this example circuit 221, four tuning stages comprising tuning elements L0, L1, L2 and L3 are connected in series to form the main receive signal path. Corresponding PIN diodes D0, D1, D2 and D3, connected in parallel to the tuning elements, act as switches to switch each respective tuning element either into or out of the main receive signal path in accordance with a respective control signal provided by the tuning control circuit 223. As described supra, a high voltage on a control signal is operative to forward bias the diode thus short circuiting its corresponding tuning element thereby effectively removing it from the signal path. Thus, in this example, the four control signals (Control0 278, Control1 276, Control2 274, Control3 272) provide for 16 possible $Z_{IN}$ impedance values for the antenna tuning circuit 221. It is noted that the relatively low power receive signal at the antenna permits use of only a single PIN diode to perform the switching function for a tuning element.

Third Embodiment Antenna Tuning Circuit

Figure 7:
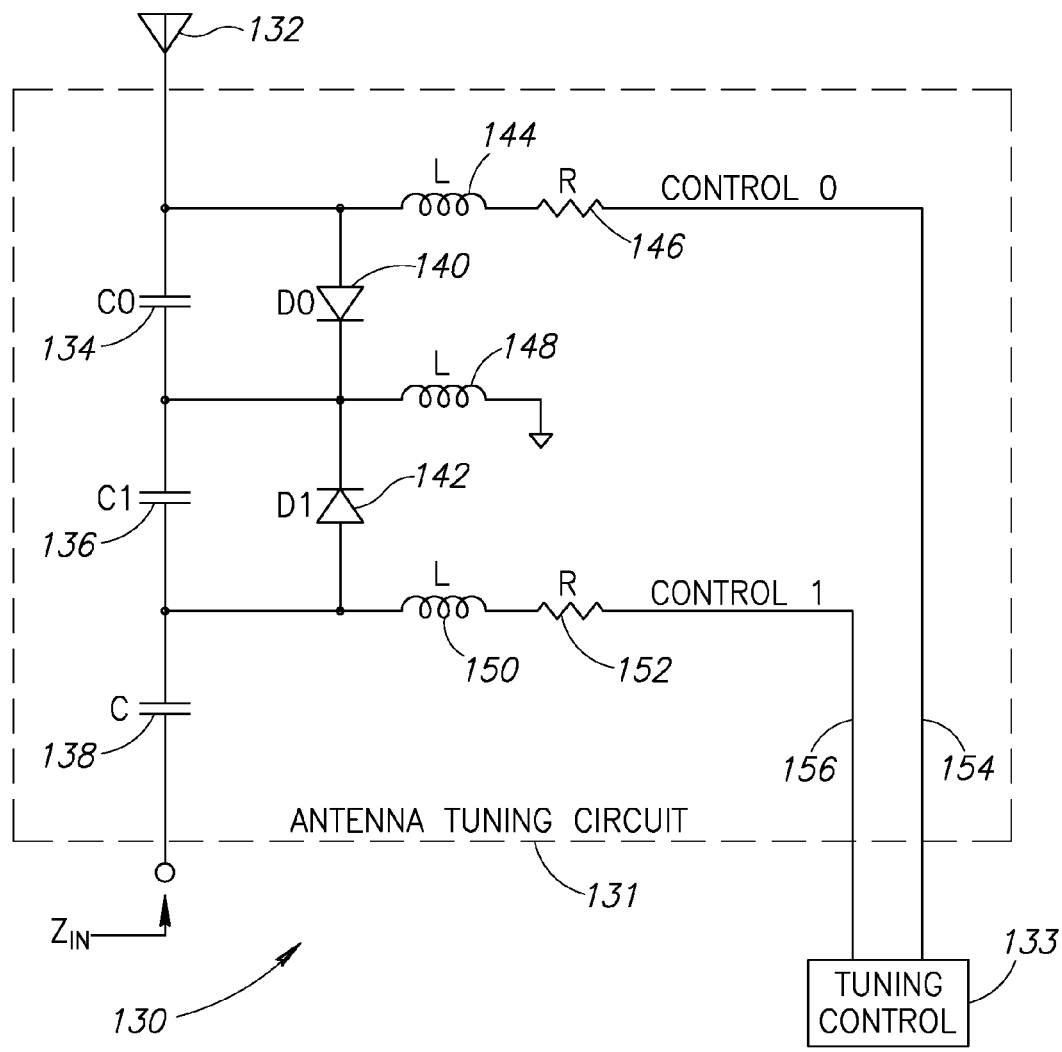
FIG. 7 is a schematic diagram illustrating a third example embodiment of the antenna tuning circuit of the present invention having series connected tuning elements.

A schematic diagram illustrating a third example embodiment of the antenna tuning circuit of the present invention having series connected tuning elements is shown in FIG. 7. The circuit, generally referenced 130, comprises a tuning circuit 131 coupled to antenna 132 and a tuning control circuit 133. The tuning circuit comprises two series connected tuning stages comprising tuning elements made up of capacitors C0 (134), C1 (136), DC blocking capacitor C 138, RF chokes L 144, 148, 150, resistors R 146, 152 and switching devices comprising PIN diodes D0 (140), D1 (142).

In this example circuit 131, two tuning stages comprising tuning elements capacitors C0 and C1 are connected in series to form the main receive signal path rather than inductors as in the example circuits 91 (FIG. 5) and 221 (FIG. 6). Corresponding PIN diodes D0 and D1 connected in parallel to the tuning elements act as switches to switch each respective tuning element either into or out of the main receive signal path in accordance with a respective control signal provided by the tuning control circuit 133. As described supra, a high voltage on a control signal is operative to forward bias the diode thus short circuiting its corresponding tuning element thereby effectively removing it from the signal path. Thus, in this example, the two control signals (Control0 154, Control1 156) provide for four possible $Z_{IN}$ impedance values for the antenna tuning circuit 131.

Fourth Embodiment Antenna Tuning Circuit

Figure 8:
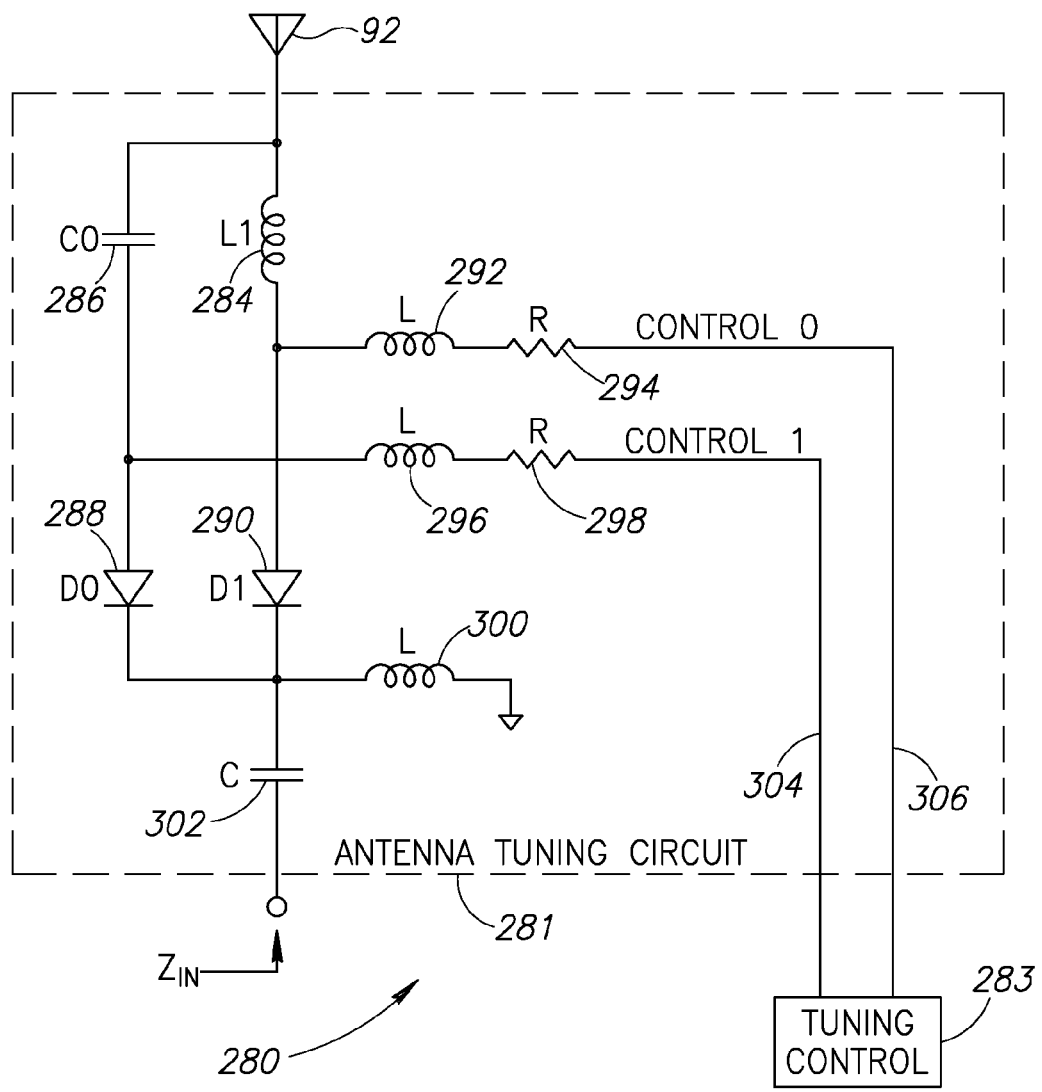
FIG. 8 is a schematic diagram illustrating a fourth example embodiment of the antenna tuning circuit of the present invention having parallel connected tuning elements.

A schematic diagram illustrating a fourth example embodiment of the antenna tuning circuit of the present invention having parallel connected tuning elements is shown in FIG. 8. The circuit, generally referenced 280, comprises a tuning circuit 281 coupled to antenna 282 and a tuning control circuit 283. The tuning circuit comprises two parallel connected tuning stages comprising tuning elements made up of capacitor C0 (286), inductor L1 (284), DC blocking capacitor C 302, RF chokes L 292, 296, 300, resistors R 294, 298 and switching devices comprising PIN diodes D0 (288), D1 (290).

In this example circuit 281, two tuning stages are connected in parallel to form the main receive signal path rather than in series as in the example circuits described supra. The two tuning stages comprise tuning elements capacitor C0 and inductor L1. Corresponding PIN diodes D0 and D1 connected in series to the tuning elements act as switches to switch each respective tuning element either into or out of the main receive signal path in accordance with a respective control signal provided by the tuning control circuit 283. Thus, in this example, the two control signals (Control0 306, Control1 304) provide for four possible $Z_{IN}$ impedance values for the antenna tuning circuit 281.

In the series control configuration, a high voltage on a control signal is operative to forward bias the diode thereby electrically inserting the corresponding tuning element into the main receive signal path. A low voltage on a control signal leaves its corresponding PIN diode in a non-forward biased operating state thereby effectively removing the corresponding tuning element from the main receive signal path.

Note that placing PIN diodes D0 and D1 in series with their respective tuning elements provides the capability to connect capacitor C0 and inductor L1 to the main signal path separately. For example, when the digital control signal Control0 is in a high voltage state, the corresponding diode D0 is forward biased. A forward biased PIN diode can be considered a resistor having very low resistance for RF signals. Since this diode is connected in series to the capacitor C0, capacitor C0 can be effectively considered connected to the main receive signal path. Similarly, when Control1 signal on diode D1 is high, inductor L1 is also electrically inserted into the main receive signal path.

Fifth Embodiment Antenna Tuning Circuit

Figure 9:
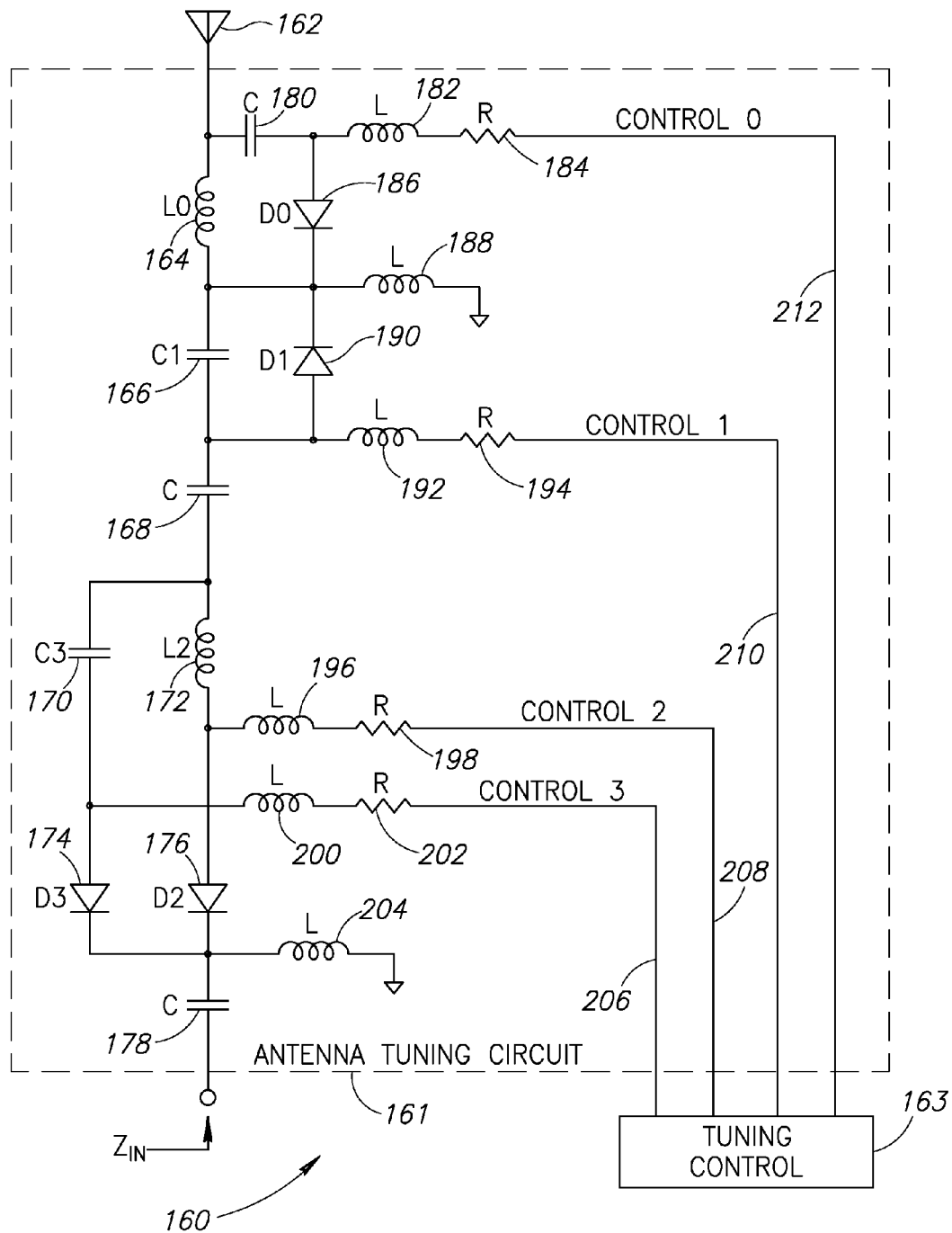
FIG. 9 is a schematic diagram illustrating a fifth example embodiment of the antenna tuning circuit of the present invention having a combination of series connected and parallel connected tuning elements.

A schematic diagram illustrating a fifth example embodiment of the antenna tuning circuit of the present invention having a combination of series connected and parallel connected tuning elements is shown in FIG. 9. The circuit, generally referenced 160, comprises a tuning circuit 161 coupled to antenna 162 and a tuning control circuit 163. The tuning circuit comprises four tuning stages arranged in a series-parallel combination which includes two series connected tuning stages comprising tuning elements made up of inductor L0 (164), capacitor C0 (166) and two parallel connected tuning stages comprising tuning elements made up of inductor L2 (172), capacitor C3 (170), DC blocking capacitors C 180, 168, 178, RF chokes L 182, 188, 192, 196, 200, 204, resistors R 184, 194, 198, 202 and switching devices comprising PIN diodes D0 (186), D1 (190), D2 (176), D3 (174).

In this example circuit 161, four tuning stages are connected in a series-parallel combination to form the main receive signal path. Two tuning stages comprising tuning elements inductor L0 and capacitor C1 are connected in a series configuration. Corresponding PIN diodes D0 and D1 connected in series to the tuning elements L0, C1 act as switches to switch each respective tuning element either into or out of the main receive signal path in accordance with a respective control signal Control0 212, Control1 210 provided by the tuning control circuit 163.

The two switching elements comprising PIN diodes D0 and D1 are connected in parallel to tuning elements L0 and C1, respectively. Each of the PIN diodes has two switching states (i.e. operating modes), namely either forward biased or not forward biased. By switching the diodes between their two operating modes, inductor L0 and capacitor C1 are individually short circuited.

For example, when the digital control signal Control0 is high, the diode D0 is in forward bias. A PIN diode in forward bias can be considered a resistor with very low resistance value for RF signals. Given this diode is parallel to the inductor L0, L0 can be effectively replaced by a short circuit. Therefore, when the Control0 signal voltage applied to diode D0 is high, L0 is electrically short circuited. Similarly, when the Control1 signal voltage applied to diode D1 is high, C1 is electrically short circuited.

The circuit also comprises two tuning stages made up of tuning elements inductor L2 and capacitor C3 connected in a parallel configuration and coupled to the series combination via capacitor C 168. Corresponding PIN diodes D2 and D3 connected in series with the tuning elements L2, C3 act as switches to switch each respective tuning element either into or out of the main receive signal path in accordance with a respective control signal Control2 208, Control3 206 provided by the tuning control circuit 163. In this example, the four control signals (Control0, Control1, Control2, Control3) provide for 16 possible $Z_{IN}$ impedance values for the antenna tuning circuit 161.

In the parallel combination of L2, C3, a high voltage on a control signal is operative to forward bias the diode thereby electrically inserting the corresponding tuning element into the main receive signal path. A low on a control signal leaves its corresponding PIN diode in a non-forward biased operating state thereby effectively removing the corresponding tuning element from the main receive signal path.

Note that placing the PIN diodes D2, D3 in series with their respective tuning elements L2, C3 provides the capability to connect L2, C3 to the main signal path separately. For example, when the digital control signal Control2 is in a high voltage state, the corresponding diode D2 is forward biased. A forward biased PIN diode can be considered a resistor having very low resistance for RF signals. Since this diode is connected in series to L2, L2 can be effectively considered connected to the main receive signal path. Similarly, when Control3 signal on diode D3 is high, capacitor C3 is also electrically inserted into the main receive signal path.

A truth table listing all possible 16 combinations of the control signals for the antenna tuning circuit in the example circuit 161 of FIG. 9 is presented below in Table 1.

TABLE 1

Antenna Tuning Circuit Truth Table

| Control0 | Control1 | Control2 | Control3 | Active Inductors | Active Capacitors | Total Tuning Impedance |
|---|---|---|---|---|---|---|
| 0 | 0 | 0 | 0 | L0 | C1 | ∞ (open) |
| 0 | 0 | 0 | 1 | L0 | C1, C3 | $Z_{L0} + Z_{C1} + Z_{C3}$ |
| 0 | 0 | 1 | 0 | L0, L2 | C1 | $Z_{L0} + Z_{C1} + Z_{L2}$ |

TABLE 1-continued

Antenna Tuning Circuit Truth Table

| Control0 | Control1 | Control2 | Control3 | Active Inductors | Active Capacitors | Total Tuning Impedance |
|---|---|---|---|---|---|---|
| 0 | 0 | 1 | 1 | L0, L2 | C1, C3 | $Z_{L0} + Z_{C1} + (Z_{L2} \| Z_{C3})$ |
| 0 | 1 | 0 | 0 | L0 | — | ∞ (open) |
| 0 | 1 | 0 | 1 | L0 | C3 | $Z_{L0} + Z_{C3}$ |
| 0 | 1 | 1 | 0 | L0 | L2 | $Z_{L0} + Z_{L2}$ |
| 0 | 1 | 1 | 1 | L0, L2 | C3 | $Z_{L0} + (Z_{L2} \| Z_{C3})$ |
| 1 | 0 | 0 | 0 | — | C1 | ∞ (open) |
| 1 | 0 | 0 | 1 | — | C1, C3 | $Z_{C1} + Z_{C3}$ |
| 1 | 0 | 1 | 0 | L2 | C1 | $Z_{C1} + Z_{L2}$ |
| 1 | 0 | 1 | 1 | L2 | C1, C3 | $Z_{C1} + (Z_{L2} \| Z_{C3})$ |
| 1 | 1 | 0 | 0 | — | — | ∞ (open) |
| 1 | 1 | 0 | 1 | — | C3 | $Z_{C3}$ |
| 1 | 1 | 1 | 0 | L2 | — | $Z_{L2}$ |
| 1 | 1 | 1 | 1 | L2 | C3 | $Z_{L2} \| Z_{C3}$ |

For each value of the four control signals, the inductors and capacitors that are made active, i.e. electrically inserted into the main receive signal path, are listed along with the corresponding total antenna tuning impedance.

Illustrative Antenna Tuning Circuit Example

To aid in understanding the principles of the present invention, an illustrative example is provided in which guidelines are provided for selecting the values of the AC coupling capacitors C, the RF chokes L for blocking AC (DC coupling) and the current limiting resistors R.

For this example, it is assumed that the operating frequency of the circuit is 1 GHz. The PIN diode represents a 1 Ohm resistance when biased with 10 mA of current with a 1 V dropout. Assume the digital control signals swing from 0 V to 3 V.

To select the value C of the capacitor, its impedance at the operating frequency is considered. In this example, the impedance of the capacitor C should preferably be much less than 1 Ohm at 1 GHz operating frequency to provide an effective electrical short at RF frequencies. With these parameters and constraints, the expression for the value of the impedance $Z_C$ is given by $$Z_C = \frac{1}{2\pi f C} \ll 1 \text{ Ohm} \quad (4)$$

Solving for C yields the following $$C \gg \frac{1}{2\pi f} = \frac{1}{2\pi \times 10^9} = 159 \text{ pF} \quad (5)$$

To select the value L of the inductor, its impedance at the operating frequency is considered. In this example, the impedance of the inductor L should preferably be much more than 1 Ohm at 1 GHz operating frequency to provide an effective electrical open at RF frequencies. With these parameters and constraints, the expression for the value of the impedance $Z_L$ is given by $$Z_L = 2\pi f L \gg 1 \text{ Ohm} \quad (6)$$

Solving for L yields the following $$L \gg \frac{1}{2\pi f} = \frac{1}{2\pi \times 10^9} = 159 \text{ pH} \quad (7)$$

The value of the resistor R should be chosen such that it generates a voltage drop of approximately 2 V to allow for a 1 V drop across the PIN diode and that it conducts 10 mA of current. The following expression solves for the value of the resistor R.

$$R = \frac{V}{I} = \frac{2}{0.01} = 200 \text{ Ohms} \quad (8)$$

Mobile Device/Cellular Phone/PDA System

Figure 10:
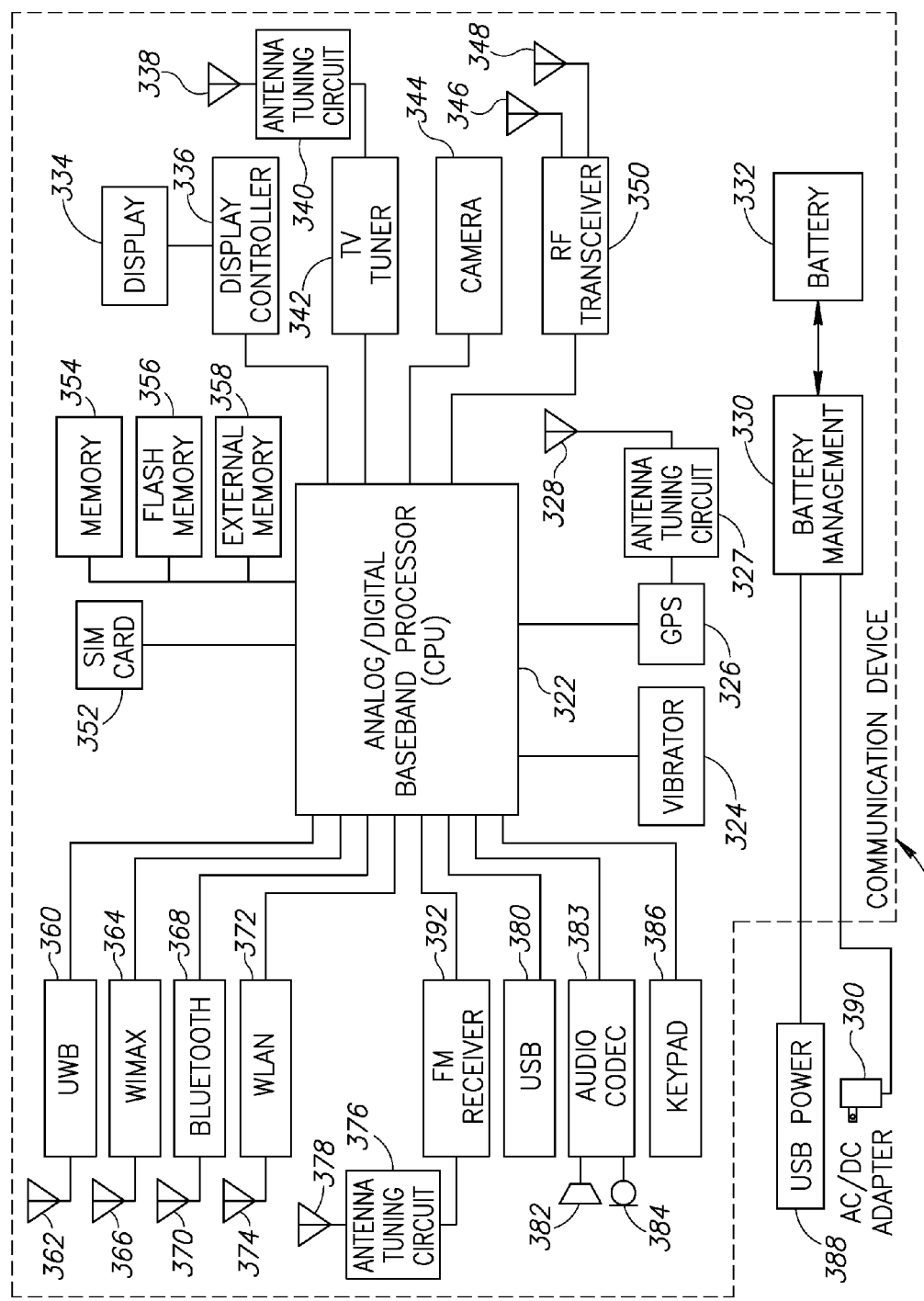
FIG. 10 is a simplified block diagram illustrating an example communication device incorporating the digitally controlled antenna tuning circuit of the present invention.

A block diagram illustrating an example communication device in more detail incorporating the digitally controlled antenna tuning circuit of the present invention is shown in FIG. 10. The communication device may comprise any suitable wired or wireless device such as a multimedia player, mobile device, cellular phone, PDA, wireless personal area network (WPAN) device, Bluetooth device, etc. For illustration purposes only, the communication device is shown as a cellular phone or smart phone. Note that this example is not intended to limit the scope of the invention as the antenna tuning circuit of the present invention can be implemented in a wide variety of wireless and wired communication devices.

The cellular phone, generally referenced 320, comprises a baseband processor or CPU 322 having analog and digital portions. The basic cellular link is provided by the RF transceiver 350 and related one or more antennas 346, 348. A plurality of antennas is used to provide antenna diversity which yields improved radio performance. The cell phone also comprises internal RAM and ROM memory 354, Flash memory 356 and external memory 358.

Several user interface devices include microphone 384, speaker 382 and associated audio codec 383, a keypad for entering dialing digits 386, vibrator 324 for alerting a user, camera and related circuitry 344, a TV tuner 342 coupled to an associated antenna 338 via the antenna tuning circuit constructed in accordance with the present invention, display 334 and associated display controller 336 and GPS receiver 326 coupled to associated antenna 328 via antenna tuning circuit 327.

A USB interface connection 380 provides a serial link to a user's PC or other device. An FM receiver 392 coupled to antenna 378 via antenna tuning circuit 376 provide the user the ability to listen to FM broadcasts. WLAN radio and interface 372 and antenna 374 provide wireless connectivity when in a hot spot or within the range of an ad hoc, infrastructure or mesh based wireless LAN network. A Bluetooth radio and interface 368 and antenna 370 provide Bluetooth wireless connectivity when within the range of a Bluetooth wireless network. Further, the communication device 320 may also comprise a WiMAX radio and interface 364 and antenna 366. The communication device 320 also comprises an Ultra Wideband (UWB) radio (e.g., MBOA-UWB based radio) and interface 360 and antenna 362. SIM card 352 provides the interface to a user's SIM card for storing user data such as address book entries, etc.

Portable power is provided by the battery 332 coupled to battery management circuitry 330. External power is provided via USB power 388 or an AC/DC adapter 390 connected to the battery management circuitry which is operative to manage the charging and discharging of the battery 332.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An antenna tuning circuit for use with small signal receive signals, comprising:
   one or more tuning stages coupled to an antenna for receiving a radio frequency (RF) signal, said one or more tuning stages configured in series and/or parallel/series configuration with a single main signal path extending from a single antenna to a single output;
   wherein each said tuning stage comprises a single PIN diode operative to insert and remove its respective individual tuning stage from said main signal path in accordance with a corresponding respective control signal, wherein each respective PIN diode is connected in parallel across an associated tuning stage for series type tuning stages and connected in series with an associated tuning stage for parallel/series type tuning stages;
   wherein in each tuning stage, said corresponding control signal is DC coupled to an anode of a respective tuning stage PIN diode while a cathode of said respective tuning stage PIN diode is DC coupled directly to ground without passing through any intermediate tuning stages; and
   wherein the operating bias point of each tuning stage PIN diode is set by a corresponding current limiting resistor and control signal, said PIN diode operating bias point determining the resonant frequency, bandwidth and input impedance of said antenna tuning circuit, which is different than the natural resonant frequency and bandwidth of said antenna.

2. The circuit according to claim 1, wherein said control signal comprises DC bias voltages adapted to forward bias zero or more of said one or more PIN diodes to yield a desired impedance for said antenna tuning circuit.

3. The circuit according to claim 1, wherein said tuning stages comprise a series combination of inductors.

4. The circuit according to claim 1, wherein said tuning stages comprise a parallel/series combination of inductors.

5. The circuit according to claim 1, wherein said tuning stages comprise a series combination of capacitors.

6. The circuit according to claim 1, wherein said tuning stages comprise a parallel/series combination of capacitors.

7. The circuit according to claim 1, wherein said tuning stages comprise one or more series and parallel/series combinations of reactive components.

8. The circuit according to claim 1, wherein a plurality of said tuning stages is arranged in series configuration and their corresponding PIN diodes are connected in parallel thereto.

9. The circuit according to claim 1, wherein a plurality of said tuning stages is arranged in parallel configuration and their corresponding PIN diodes are connected in series thereto.

10. The circuit according to claim 1, wherein a tuning stage in series with said main signal path is removed therefrom by forward biasing its corresponding PIN diode connected in parallel therewith.

11. The circuit according to claim 1, wherein a tuning stage in parallel with said main signal path is inserted thereto by forward biasing its corresponding PIN diode connected in series therewith.

12. An antenna tuning circuit for use with small signal receive signals, comprising:
   one or more tuning stages coupled in a series configuration with a single main signal path extending from a single antenna to a single output;
   wherein each said tuning stage comprises a single PIN diode coupled in parallel across its respective tuning stage and operative to electrically insert and remove its respective individual tuning stage from said main signal path in accordance with a corresponding respective control signal;
   wherein in each tuning stage, said corresponding control signal is DC coupled to an anode of a respective tuning stage PIN diode while a cathode of said respective tuning stage PIN diode is DC coupled directly to ground without passing through any intermediate tuning stages; and
   wherein the operating bias point of each tuning stage PIN diode is set by a corresponding current limiting resistor and control signal, said PIN diode operating bias point determining the resonant frequency, bandwidth and input impedance of said antenna tuning circuit, which is different than the natural resonant frequency and bandwidth of said antenna.

13. The circuit according to claim 12, wherein said control signal comprises DC bias voltages adapted to forward bias zero or more of said one or more PIN diodes to yield a desired impedance for said antenna tuning circuit.

14. The circuit according to claim 12, wherein each of said one or more tuning stages comprises one or more reactive components.

15. The circuit according to claim 12, wherein a tuning stage is electrically removed from said main signal path by forward biasing its corresponding PIN diode which creates an electrical short across the corresponding tuning stage.

16. The circuit according to claim 12, wherein a tuning stage is electrically inserted into said main signal path by not forward biasing its corresponding PIN diode.

17. An antenna tuning circuit for use with small signal receive signals, comprising:
   one or more tuning stages coupled in a parallel/series configuration with a single main signal path extending from a single antenna to a single output;
   wherein each said tuning stage comprises a single PIN diode coupled in series with its respective tuning stage and operative to electrically insert and remove its respective individual tuning stage from said main signal path in accordance with a corresponding respective digital control signal;
   wherein in each tuning stage, said corresponding control signal is DC coupled to an anode of a respective tuning stage PIN diode while a cathode of said respective tuning stage PIN diode is DC coupled directly to ground without passing through any intermediate tuning stages; and wherein the operating bias point of each tuning stage PIN diode is set by a corresponding current limiting resistor and control signal, said PIN diode operating bias point determining the resonant frequency, bandwidth and input impedance of said antenna tuning circuit, which is different than the natural resonant frequency and bandwidth of said antenna.

18. The circuit according to claim 17, wherein said control signal comprises DC bias voltages adapted to forward bias zero or more of said one or more PIN diodes to yield a desired impedance for said antenna tuning circuit.

19. The circuit according to claim 17, wherein each of said one or more tuning stages comprises one or more reactive components.

20. The circuit according to claim 17, wherein a tuning stage is electrically inserted into said main signal path by forward biasing its corresponding PIN diode which creates an electrical short in line with the corresponding tuning stage.

21. The circuit according to claim 17, wherein a tuning stage is electrically removed from said main signal path by not forward biasing its corresponding PIN diode.

22. An antenna tuning circuit for use with small signal receive signals, comprising:

a plurality of tuning elements arranged in one or more series and/or parallel/series combinations;

switching means coupled to said plurality of tuning elements and operative to connect or disconnect one or more of said tuning elements to a single main signal path thus creating an impedance network for a single antenna coupled thereto, said signal path having a single output;

said switching means comprising a plurality of PIN diodes, wherein each tuning stage comprises a single PIN diode operative to electrically switch its respective tuning element into or out of said main signal path in accordance with a corresponding respective digital control signal, wherein each respective PIN diode is connected in parallel across an associated tuning stage for series type tuning stages and connected in series with an associated tuning stage for parallel/series type tuning stages;

wherein in each tuning stage, said corresponding control signal is DC coupled to an anode of a respective tuning stage PIN diode while a cathode of said respective tuning stage PIN diode is DC coupled directly to ground without passing through any intermediate tuning stages; and wherein the operating bias point of each tuning stage PIN diode is set by a corresponding current limiting resistor and control signal, said PIN diode operating bias point determining the resonant frequency, bandwidth and input impedance of said antenna tuning circuit, which is different than the natural resonant frequency and bandwidth of said antenna.

23. The circuit according to claim 22, wherein one of said control signals comprises a DC bias voltage adapted to forward bias a respective PIN diode thereby switching a series configured tuning element out of said main circuit path.

24. The circuit according to claim 22, wherein one of said control signals comprises a DC bias voltage adapted to forward bias a respective PIN diode thereby switching a parallel/series configured tuning element into said main circuit path.

25. The circuit according to claim 22, wherein said tuning elements comprise one or more reactive components.

26. The circuit according to claim 22, wherein a tuning stage is electrically removed from said main signal path by forward biasing its corresponding PIN diode which creates an electrical short across the corresponding tuning stage and wherein a tuning stage is electrically inserted into said main signal path by not forward biasing its corresponding PIN diode.

27. A mobile communications device, comprising:

a cellular transceiver operative to receive and transmit cellular transmissions to and from a base station;

a second radio operative to only receive a signal from a single antenna coupled thereto;

an antenna tuning circuit for use with small signal receive signals coupled to said antenna and said second radio, said antenna tuning circuit comprising:

one or more tuning stages coupled to said antenna for receiving a radio frequency (RF) signal, said one or more tuning stages configured in series and/or parallel/series configuration with a single main signal path extending from said antenna to said second radio;

wherein each said tuning stage comprises a single PIN diode operative to insert and remove its respective individual tuning stage from said main signal path in accordance with a corresponding respective digital control signal, wherein each respective PIN diode is connected in parallel across an associated tuning stage for series type tuning stages and connected in series with an associated tuning stage for parallel/series type tuning stages;

wherein in each tuning stage, said corresponding control signal is DC coupled to an anode of a respective tuning stage PIN diode while a cathode of said respective tuning stage PIN diode is DC coupled directly to ground without passing through any intermediate tuning stages;

wherein the operating bias point of each tuning stage PIN diode is set by a corresponding current limiting resistor and control signal, said PIN diode operating bias point determining the resonant frequency, bandwidth and input impedance of said antenna tuning circuit, which is different than the natural resonant frequency and bandwidth of said antenna; and a processor operative to receive data from said second radio and to send and receive data to and from said cellular transceiver.

* * * * *